(12) United States Patent
Bell et al.

(10) Patent No.: US 7,374,122 B2
(45) Date of Patent: May 20, 2008

(54) SEAT BELT RETRACTOR

(75) Inventors: John Bell, Carlisle (GB); Amaya Munoz, Carlisle (GB); Martyn Palliser, Carlisle (GB); Andrew Park, Carlisle (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 343 days.

(21) Appl. No.: 11/155,366

(22) Filed: Jun. 20, 2005

(65) Prior Publication Data

US 2006/0076448 A1    Apr. 13, 2006

(30) Foreign Application Priority Data

Jul. 20, 2004    (EP) ................... 04254340

(51) Int. Cl.
 *B65H 75/48*    (2006.01)
(52) U.S. Cl. .............. 242/379.1; 242/382; 280/805
(58) Field of Classification Search ......... 242/379.1, 242/382; 297/470–472; 280/805
See application file for complete search history.

(56) References Cited

U.S. PATENT DOCUMENTS 5,618,006 A * 4/1997 Sayles ...................... 242/379.1
6,669,133 B2 * 12/2003 Palliser et al. ............ 242/379.1
2002/0050542 A1   5/2002 Nagata et al.
2002/0066817 A1 * 6/2002 Clute et al. ............... 242/379.1
2003/0098377 A1   5/2003 Nagata et al.
2005/0087641 A1 * 4/2005 Bell et al. ................. 242/379.1
2005/0139711 A1 * 6/2005 Bell et al. ................. 242/379.1

FOREIGN PATENT DOCUMENTS

EP    1 405 777 A    5/2003
EP    1 468 883 A    10/2004

* cited by examiner

*Primary Examiner*—Peter M. Cuomo
*Assistant Examiner*—Stefan Kruer
(74) *Attorney, Agent, or Firm*—Lonnie Drayer

(57) ABSTRACT

A seat belt retractor has a rotating spool for retraction or pay-out of seat belt webbing. A locking ring is attached to one end of the spool. The locking ring is locked against rotation when a crash is sensed. A force limiting means allows further pay-out of the seat belt webbing after the locking ring has locked. Coupled in the force path between the spool and the locking ring, the force limiting means has a primary force limiting means; and a secondary force limiting means. The force limiting means include an elongate deformable member, arranged such that relative rotation between the spool and the locking ring causes a predetermined length of the deformable member to be deformed during a first stage of load limiting. The cross-sectional area of the deformable member is uniform over a major portion of the predetermined length and is reduced over at least one minor portion located a distance from the end of the member.

17 Claims, 7 Drawing Sheets

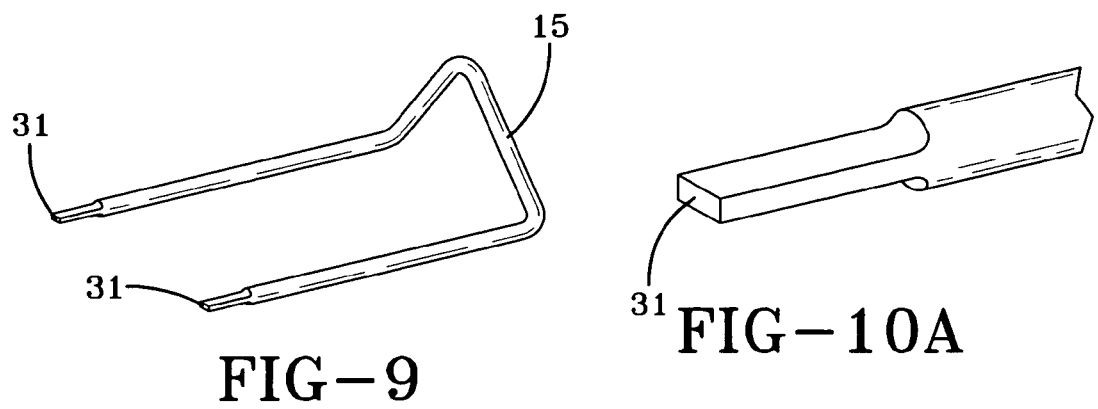
FIG-9        FIG-10A
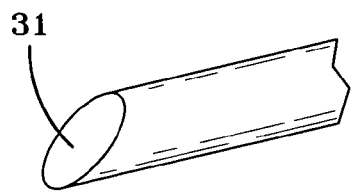            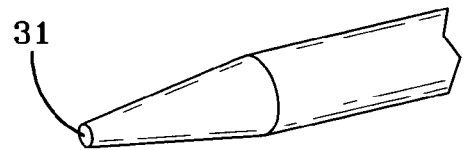
FIG-10B        FIG-10C
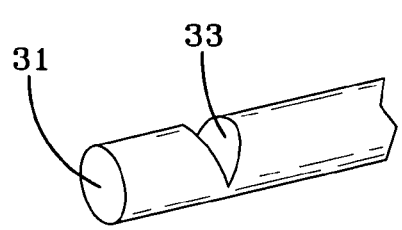            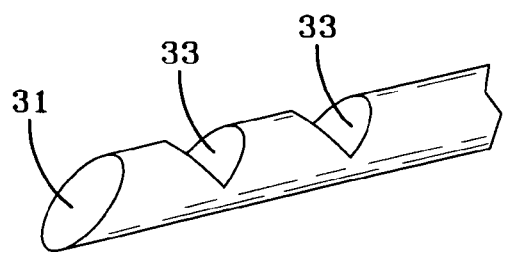
FIG-10D        FIG-10E

SEAT BELT RETRACTOR

FIELD OF THE INVENTION

The present invention relates to a seat belt retractor and particularly to a seat belt retractor with a load limiting function.

BACKGROUND OF THE INVENTION

A conventional seat belt retractor has a generally cylindrical spool on which seat belt webbing is wound. The spool is mounted to be rotatable about its longitudinal axis to wind in or pay out seat belt webbing, depending upon the direction of rotation. The spool is biased in the wind-in direction by a clock spring so that the seat belt maintains a relatively low level force on the vehicle occupant tending to pull him back into the vehicle seat in a comfortable manner but allowing him to move forward, for example to adjust a vehicle radio or access a storage compartment in the vehicle. A vehicle crash activates a crash sensor that locks the spool against rotation to prevent forward motion of the vehicle occupant.

Modern seat belts employ a load limiting function because it was found that sudden locking of the seat belt retractor, especially in a high speed vehicle crash, could exert excessive force to the vehicle occupant. To reduce this phenomenon modern seat belt retractors allow some controlled payout of the belt webbing before locking fully.

One known load limiting device, especially effective during the initial moments of a crash, functions by interposing a plastically or elastically deformable member in the force path. For example, a torsion bar may be incorporated into the retractor spool. A torsion bar is made of steel that twists about its own axis when high torque is applied and can rotate up to 7 or 8 times while still remaining intact to reduce the crash forces felt by the vehicle occupant.

To provide load limiting that more closely matches the varying forces exerted on the vehicle occupant during a crash, especially the higher forces during the initial moments of the crash, a two-stage load limiting seat belt retractor can be used. These so-called digressive load limiting seat belt retractors create a higher level of load limiting for a predetermined time or distance. During the initial stages of a crash a first stage of load limiting involves both the torsion bar twisting and an additional load limiting device, for example a wire being either bent or twisted or pulled out of a housing in the spool, to absorb the crash forces. When the wire is fully bent, twisted or extended (depending on the mechanism employed) then a second stage of load limiting, at a lower level, involves only the torsion bar.

However, distortion of a wire element in known seat belt retractors has been found to provide a non-uniform load limiting effect. An increase in load occurs for a short time during the initial bending of the wire element and also during the transition from the first stage to the second stage of load limiting. The present invention provides a seat belt retractor that can deliver a more constant level of load limiting.

SUMMARY OF THE INVENTION

According to the present invention there is provided a seat belt retractor comprising, a spool mounted for rotation for retraction or pay-out of seat belt webbing depending upon the rotation direction of the spool, a locking ring attached to one end of the spool, means for locking the locking ring against rotation when a crash condition is sensed, and force limiting means for allowing further pay-out of the seat belt webbing after the locking ring has locked, under the influence of a vehicle occupant's forward momentum, coupled in the force path between the spool and the locking ring, the force limiting means comprising a primary force limiting means; and a secondary force limiting means comprising an elongate deformable member, arranged such that relative rotation between the spool and the locking ring causes a predetermined length of the deformable member to be deformed during a first stage of load limiting, wherein the cross-sectional area of the deformable member is uniform over a major portion of the predetermined length and is reduced over at least one minor portion located a predetermined distance from the end of the member.

BRIEF DESCRIPTION OF THE DRAWINGS

FIG. 9 is a perspective view of a wire according to the present invention.

FIGS. 10A to 10E are perspective views of wire ends according to different embodiments of the present invention.

DETAILED DESCRIPTION OF THE INVENTION

Figure 1:
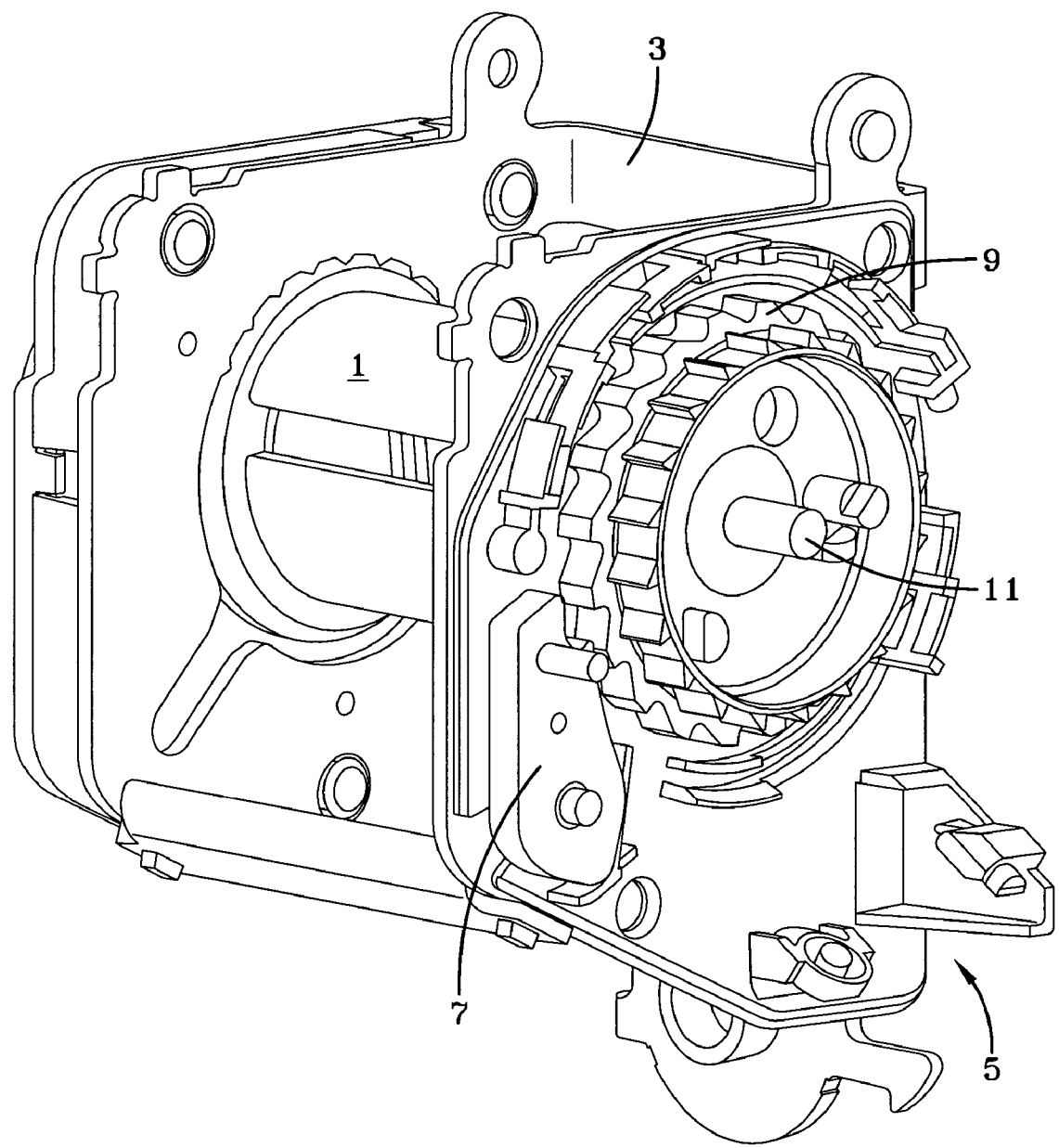
FIG. 1 is a perspective view of a standard prior art seat belt retractor including a spool.

The present invention can be used in a conventional seat belt retractor that is well known to a person skilled in the art. Such a known seat belt retractor is shown in FIG. 1 and comprises a cylindrical retractor spool 1 mounted for rotation about a spindle 11 in a frame 3 to wind in and pay out webbing (not shown).

In a crash, a sensor positioned at 5 activates a locking pawl 7 to engage a toothed locking ring 9 fixed to one end of the spool 1 to prevent rotation of the locking ring 9 and begin the spool locking process. The other end of the spool 1 is connected to a rewind spring that is a clock type coiled spring that biases the spool to a condition in which the webbing is wound on the spool 1.

In a conventional load limiting seat belt retractor the spindle 11, which may be a torsion bar, is mounted along the spool axis and fixed at one end to the locking ring 9 and at the other end to the spring end of the spool 1. Upon locking of the locking ring 9 by the locking pawl 7 during a crash, the momentum of the vehicle occupant continues to pull webbing off the spool and to rotate the spool against the deformable force of the torsion bar connecting the locking ring to the spool 1. Above a predetermined limit the crash force causes the torsion bar 11 to twist about its axis allowing the spool 1 to rotate under conditions determined by the properties of the torsion bar, thus providing a load limiting function to lessen the effect, via the seat belt webbing, of the crash pulse on the vehicle occupant.

Figure 4:
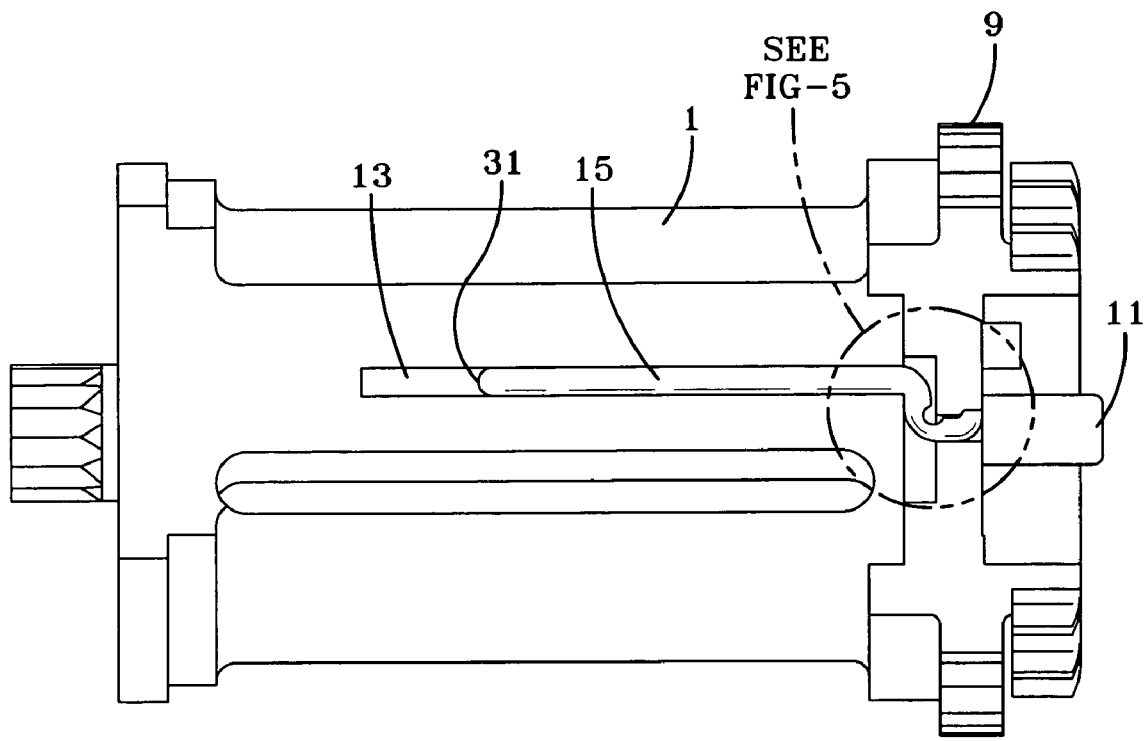
FIG. 4 is a part cut-away plan view of the spool and locking assembly of FIG. 1 just after the start of load limiting.
Figure 5:
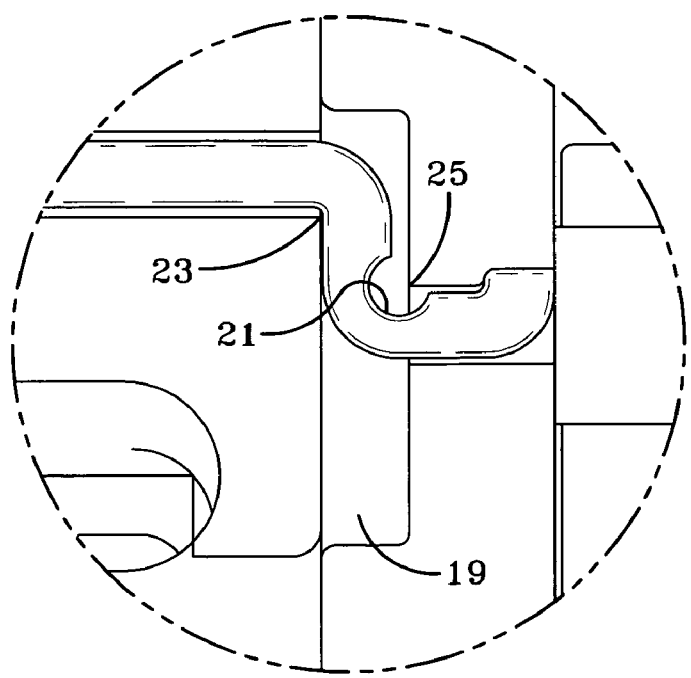
FIG. 5 is a close-up view of the circled area of FIG. 4.
Figure 6:
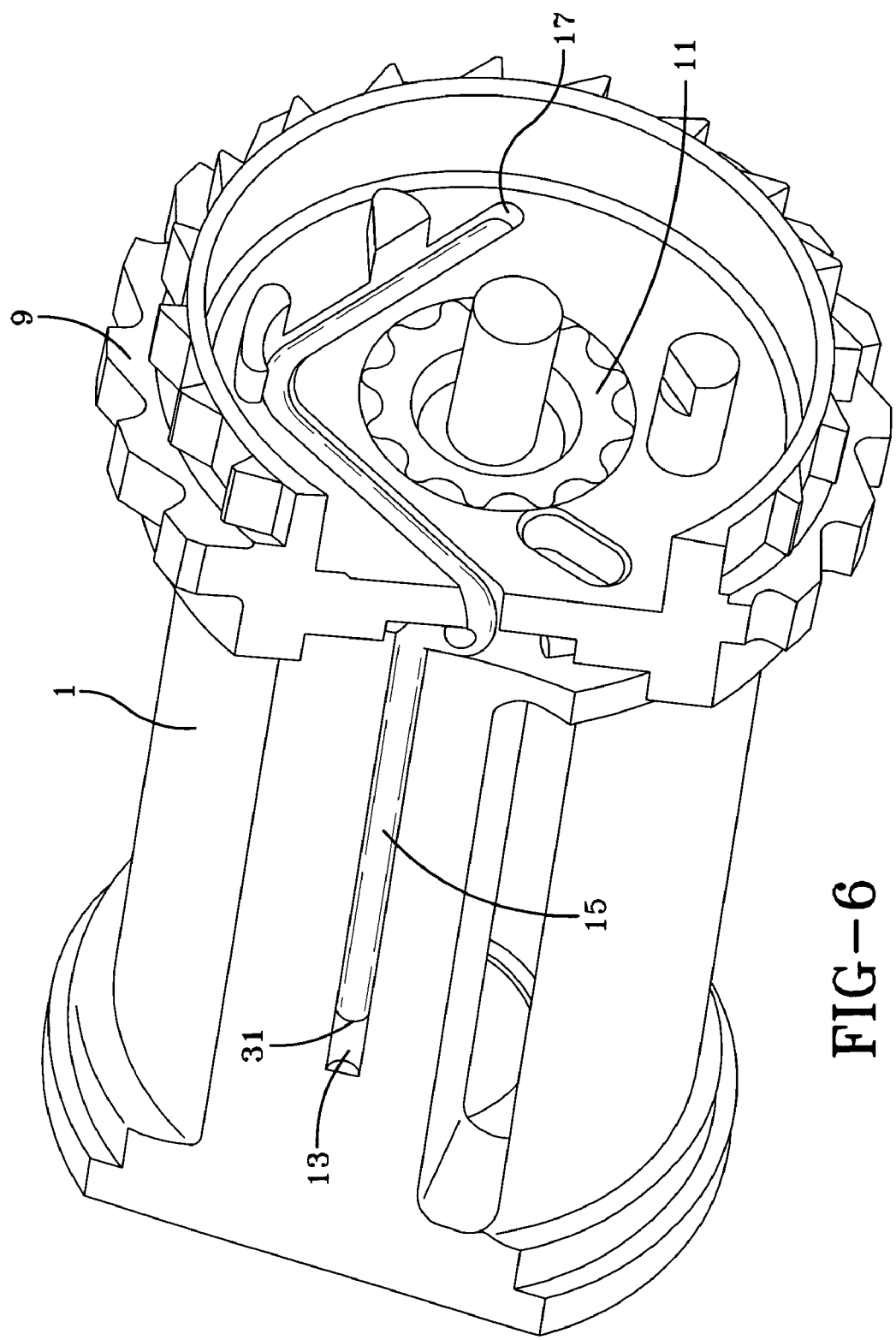
FIG. 6 is a part cut-away plan view of the spool and locking assembly of FIG. 4.
Figure 8:
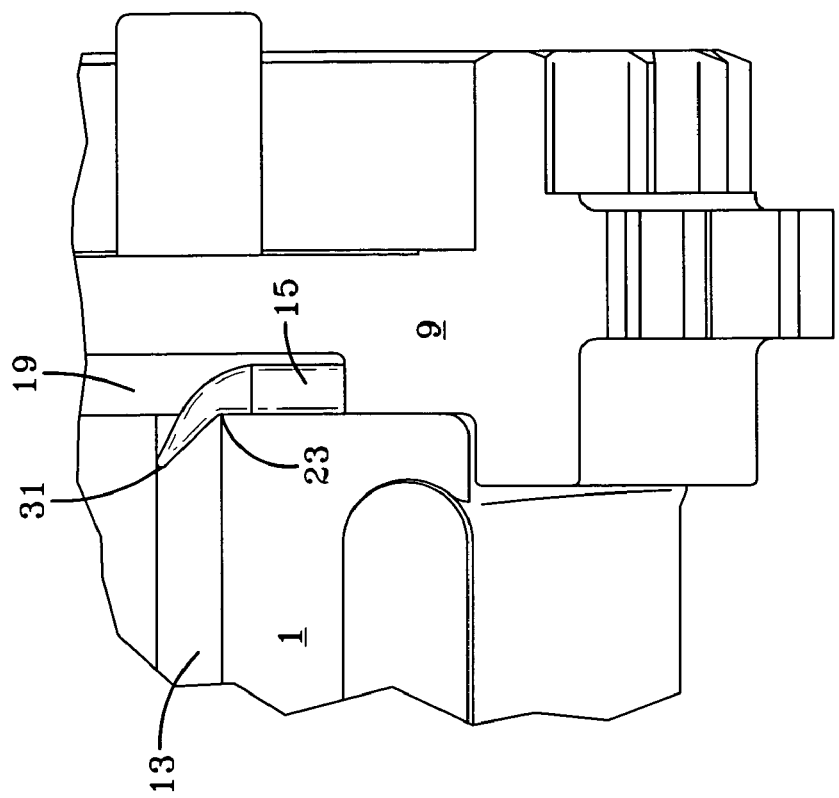
FIG. 8 is a close-up view of the right hand side of the spool and locking assembly of FIG. 4 during disengagement of the wire.

FIGS. 2 to 6 illustrate one embodiment of the present invention. A torsion bar 11 is a primary load limiting element and a secondary load limiting element is housed in a recess in the body of the spool 1. The secondary load limiting element 15 comprises a length of deformable material such as wire that may take the form shown in FIG. 9. FIG. 6 shows each end of the wire 15 extending into each of two passageways 13 in the spool body. Each passageway 13 runs parallel to the torsion bar 11 and has an open end that is in line with a hole in the locking ring 9 such that the ends 31 of the wire 15 can be inserted through the holes in the locking ring 9 into the passageways 13. A groove 17 extends between the holes in the locking ring 9 and around the end of the torsion bar 11. The wire 15 in FIG. 9 is shaped such that its central portion fits into the groove 17 when the wire ends 31 are fully inserted into passageways 13.

Figure 2:
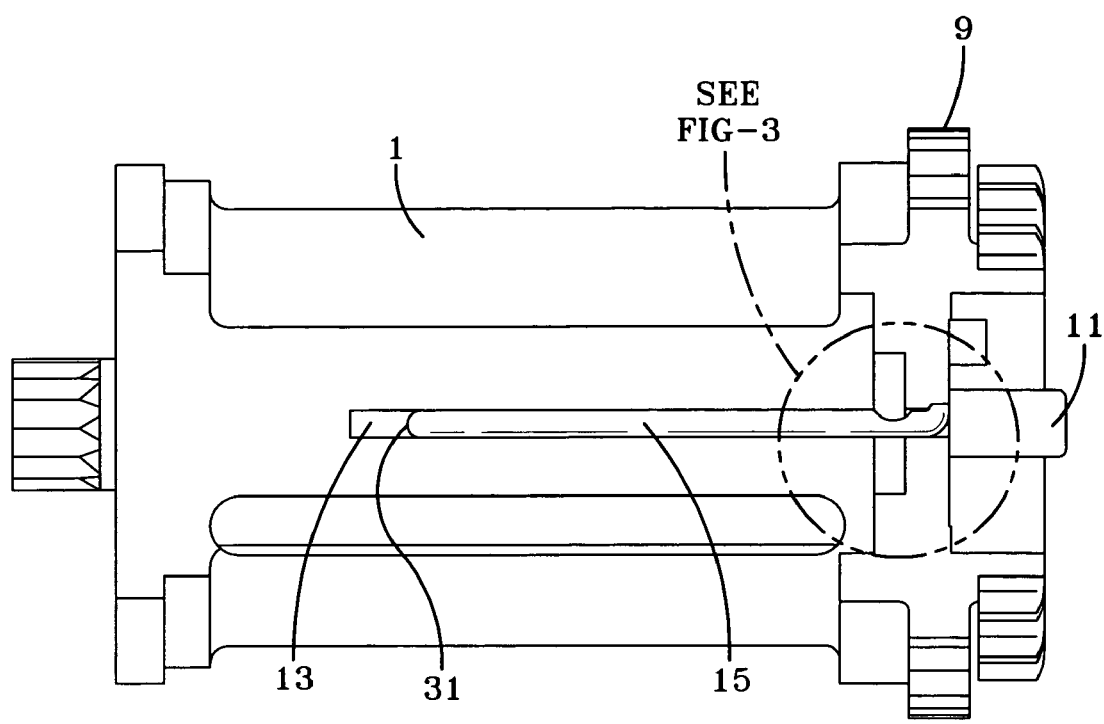
FIG. 2 is a part-cut-away plan view of a spool and locking assembly arrangement according to an embodiment of the present invention.

FIG. 2 shows the arrangement of the wire 15 in a passageway 13 prior to load limiting such that the spool 1 and the locking ring 9 are free to rotate.

The inclusion of at least one reduced cross-sectional portion 21 along the length of the wire 15 is beneficial in that it serves to reduce the bending moment required to deform the deformable member. A reduction in cross-sectional area can advantageously be positioned along the length of the deformable member to coincide with a specific point during load limiting.

Figure 3:
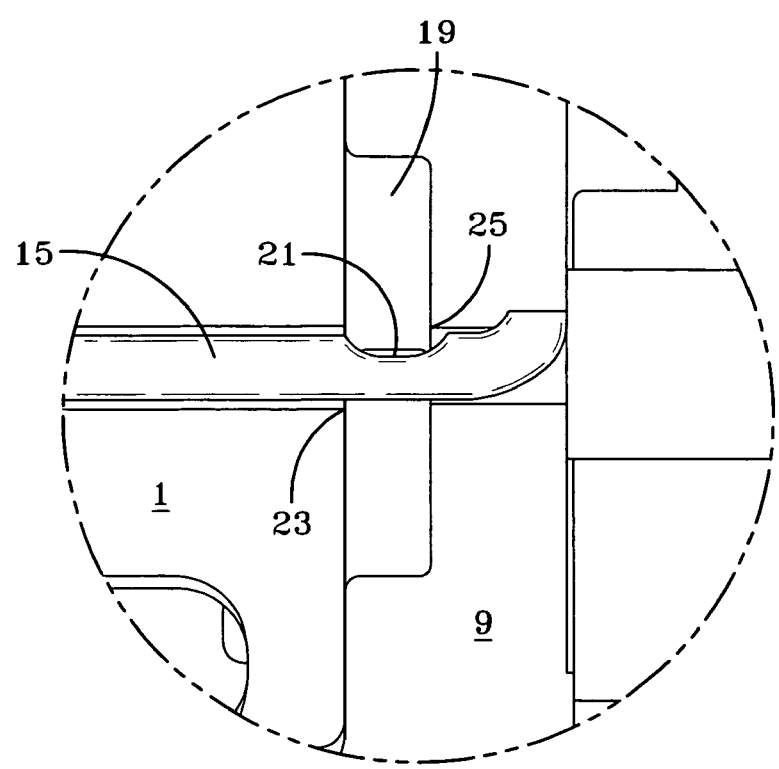
FIG. 3 is a close-up view of the circled area of FIG. 2 prior to load limiting.

FIG. 3 shows in greater detail the profile of the portion of the wire 15 at a recess 19 formed between the spool 1 and the locking ring 9. The cross sectional area of the wire 15 is modified in the region of the recess 19 by a relief or cut-out 21 in the wire forming a discontinuity in the surface of the wire. In FIG. 3 the cut-out 21 is an arc shaped lateral groove.

When the locking ring 9 is locked during a crash, further force on the spool 1 causes it to move relative to the locking ring 9 and the wire 15 is pulled out of the passageways 13 in the spool 1. The wire 15 is drawn into the recess 19 in a circular path about the spool axis such that the wire 15 is deformed and is wound around either the torsion bar or the locking ring 9 providing an additional load limiting effect during a first stage of load limiting. The combination of the torsion bar and the load limiting wire 15 raises the initial load limiting threshold giving a higher combined level of load limiting than the torsion bar alone (i.e. reducing the crash forces felt by the vehicle occupant more than with the torsion bar alone).

Figure 11:
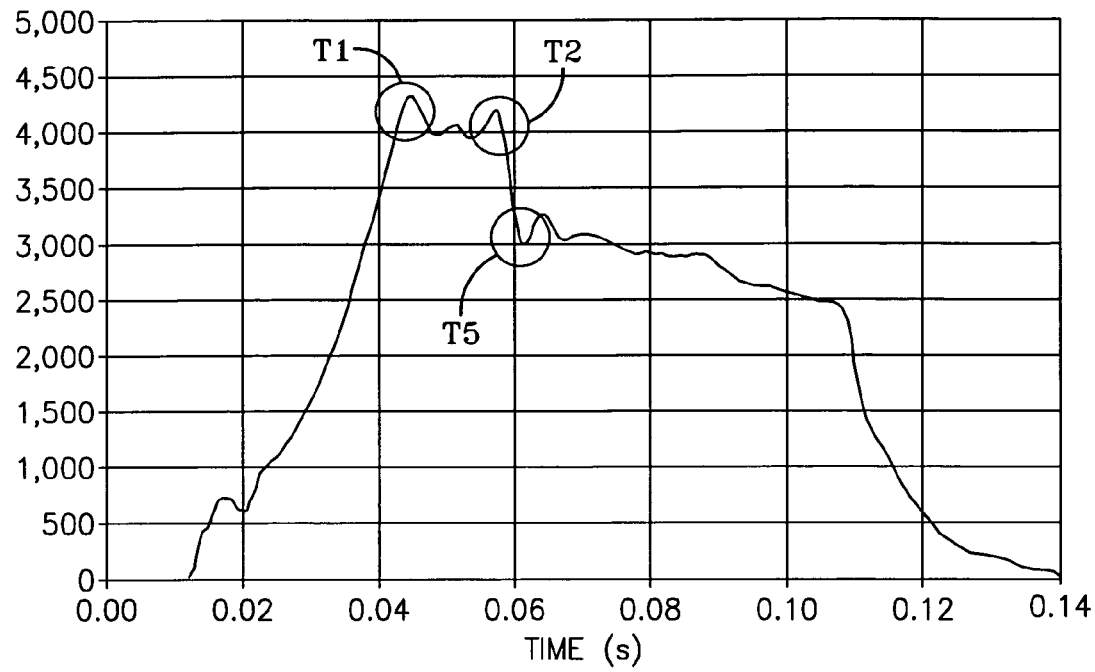
FIG. 11 is a graph of force against time showing various stages of a crash curve for known seat belt retractors.
Figure 12:
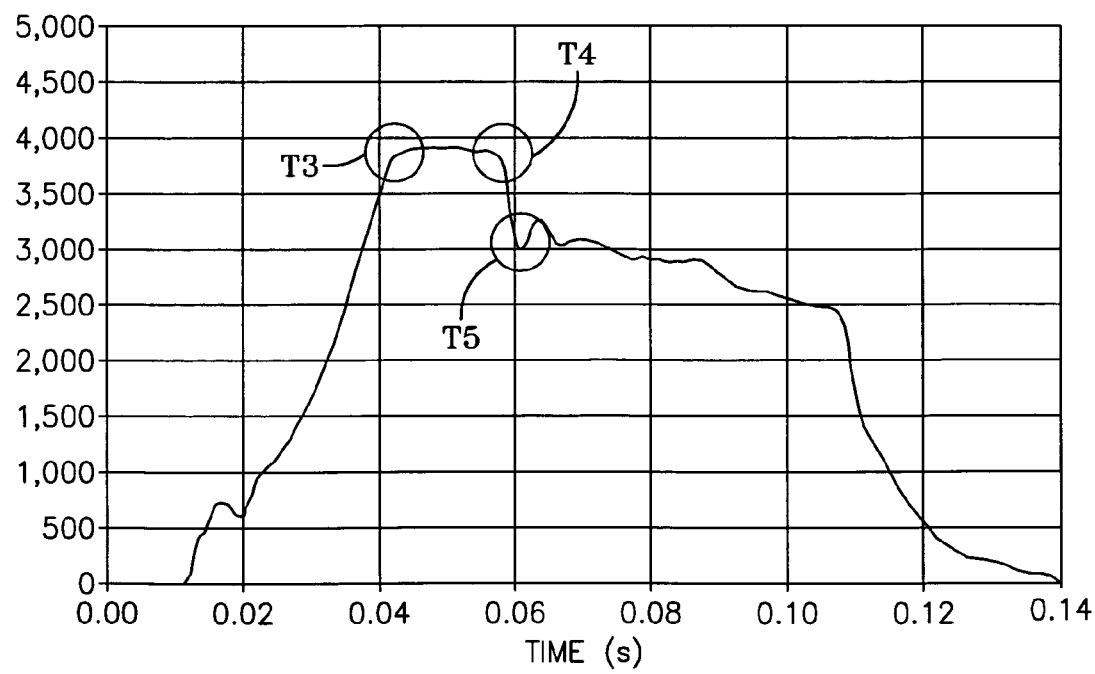
FIG. 12 is a graph of force against time showing various stages of a crash curve for a seat belt retractor according to the present invention.

FIGS. 4, 5 and 11 illustrate the bending of the wire 15 at the start of load limiting. The wire 15 is bent around the corner 23 on the spool 1 and corner 25 on the locking ring 9. In an unmodified wire this produces a relatively high initial bending moment for a short period of time as shown by the first load spike T1 on the graph of force against time of FIG. 11. The cut-out 21 reduces the initial bending moment of the wire 15 and substantially reduces or eliminates the first load spike T1, providing a more gradual increase in load at time T3 as shown in FIG. 12 in the initial moments of load limiting.

At the end of the first stage of load limiting after a predetermined number of turns of the spool 1 the wire 15 exits the passageways 13 in the spool 1 due to its limited length. Once the wire 15 has completely exited the passageways 13 the momentum of the vehicle occupant is absorbed by the torsion bar 11 alone during the second stage of load limiting from time T5 onwards.

This drop in the level of load limiting can be tailored to coincide with a vehicle occupant encountering an airbag so that the vehicle occupant is supported by a combination of the airbag and the seat belt rather than the seat belt alone.

As the wire end 31 approaches the end of the passageway 13 the bending moment of an unmodified wire increases due to the decrease in length of wire left in the passageway 13. This causes an undesirable rise in load for a short time period during disengagement of the wire 15 as exemplified by the load spike at T2 in FIG. 11.

Figure 7:
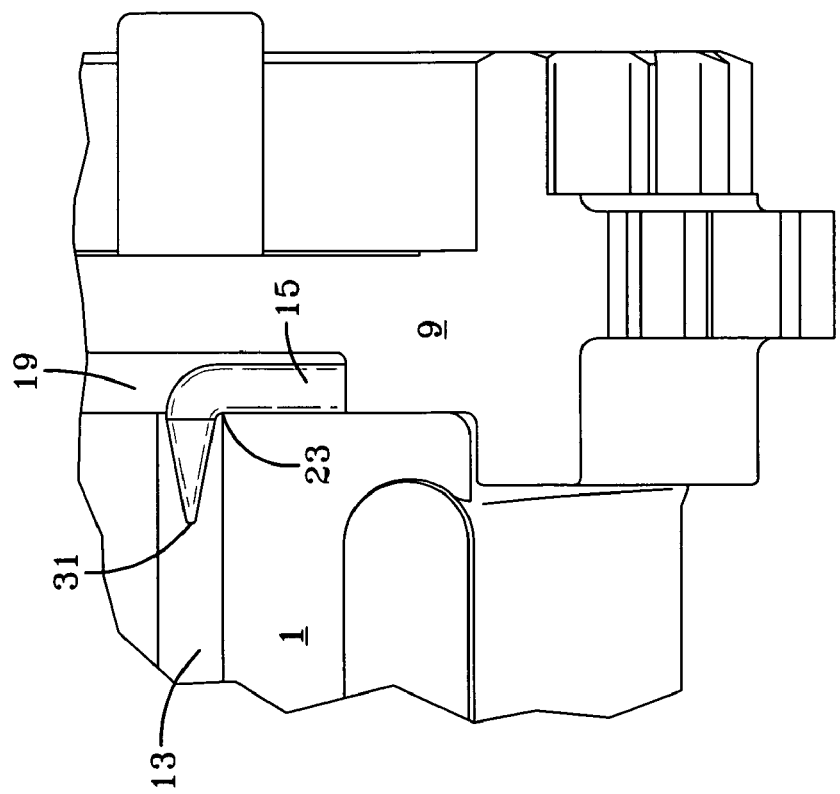
FIG. 7 is a close-up view of the right hand side of the spool and locking assembly of FIG. 4 just prior to disengagement of the wire.

FIGS. 7, 8, 10A to 10E, and 12 illustrate further embodiments of the invention in which the shape of the end 31 of wire 15 is modified. In FIG. 7 the wire end 31 is tapered. The cross-sectional area of the wire 15 decreases towards the wire end 31 over the end portion of the wire 15. As the tapered section is drawn out of the passageway 13 and deformed around corner 23 the bending moment is reduced due to the decrease in cross-sectional area of the wire 15. The undesirable load spike at T2 is reduced or eliminated resulting in the more gradual change in gradient at T4 in FIG. 12 during transition from the first to the second stage of load limiting.

A similar effect may be achieved by the alternative wire end portions of FIGS. 10A to 10C, which all display a change in cross section or >I=section in the vicinity of the distal end 31 of the wire. The reduced cross-sectional area may be formed by a discontinuity in the surface of the member such as a lateral groove or cut-out, either curved or of a V-shape.

Application of a bending moment about a V-shaped lateral groove may advantageously induce shearing of the deformable member. The vertex of a V-shaped groove provides a particularly reliable point for the inducement of shear of the deformable material when a shearing load is applied about a right-angled corner.

FIGS. 10D and 10E illustrate notches 33 in the wire 15 that take the form of V-shaped lateral grooves near the wire ends 31. As a notch 33 is drawn from the passageway 13 and bent around the corner 23 the applied load will shear the wire at notch 33 avoiding the increase in bending moment at T2 and leaving a slug of material in the end of passageway 13. The reduction in cross-sectional area of the wire 15 close to its ends 31 reduces the bending moment at the transition between the first and second stage of load limiting and provides a more gradual decrease in load during disengagement of the wire 15.

For either of the load spikes T1 or T2, the reduction in cross section or longitudinal section of the wire helps deformation, reduces interference and allows a smoother exit of the wire from the passageways 13 within the spool 1.

While the foregoing embodiments use a torsion bar as one stage of a two-stage load limiting seat belt retractor, the principle of the present invention may be put into effect in any seat belt retractor that uses any load limiting means to achieve one stage of load limiting, e.g. deformable wires.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein by reference are not to be construed as limiting to the claims.

The invention claimed is:

1. A seat belt retractor comprising:
   (a) a spool mounted for rotation for retraction or pay-out of a seat belt webbing depending upon the rotation direction of the spool;
   (b) a locking ring attached to one end of the spool; means for locking the locking ring against rotation when a crash condition is sensed; and
   (c) a force limiting means for allowing further pay-out of the seat belt webbing after the locking ring has locked, under the influence of a vehicle occupant's forward momentum, coupled in the force path between the spool and the locking ring, the force limiting means comprising
      (i) a primary force limiting means; and
      (ii) a secondary force limiting means comprising an elongate deformable member, arranged such that relative rotation between the spool and the locking ring causes a predetermined length of the deformable member to be pulled out of passageways or holes in the spool and be deformed during a first stage of load limiting, wherein the cross-sectional area of the deformable member is uniform over a major portion of the predetermined length and is reduced over at least one minor portion located a distance from an end of the member in a region of a bent part of the deformable member located in a recess formed between the spool and the locking ring to reduce an initial bending moment of the deformable member when the deformable member is pulled out of the passageways or holes in the spool.

2. The seat belt retractor according to claim 1, wherein the reduced cross-sectional area portion comprises a curved groove.

3. The seat belt retractor according to claim 1, wherein the reduced cross-sectional area comprises a V-shaped groove.

4. The seat belt retractor according to claim 1 wherein the deformable member has another reduced cross-sectional area portion located at said one end of the deformable member.

5. The seat belt retractor according to claim 1, wherein the deformable member is a wire.

6. The seat belt retractor according to claim 1, wherein the primary force limiting means comprises a torsion bar.

7. The seat belt retractor according to claim 2 wherein the deformable member has another reduced cross-sectional area portion located at said one end of the deformable member.

8. The seat belt retractor according to claim 3 wherein the deformable member has another reduced cross-sectional area portion located at said one end of the deformable member.

9. The seat belt retractor according to claim 4, wherein the spool has an elongate recess therein, arranged to receive said one end of the deformable member.

10. The seat belt retractor according to claim 9, wherein the locking ring has a groove therein, arranged to receive a central portion of the deformable member and the spool has another elongate recess therein, arranged to receive another end of the deformable member.

11. A seat belt retractor comprising:
    (a) a spool mounted for rotation for retraction or pay-out of seat belt webbing depending upon the rotation direction of the spool, the spool having two elongate recesses therein;
    (b) a locking ring attached to one end of the spool; means for locking the locking ring against rotation when a crash condition is sensed; and
    (c) a force limiting means for allowing further pay-out of the seat belt webbing after the locking ring has locked, under the influence of a vehicle occupant's forward momentum, coupled in a force path between the spool and the locking ring, the force limiting means comprising
       (i) a primary force limiting means comprising a torsion bar; and
       (ii) a secondary force limiting means comprising an elongate deformable wire, arranged such that relative rotation between the spool and the locking ring causes a portion of the length of the wire to be pulled out of passageways or holes in the spool and be deformed during a first stage of load limiting, wherein the cross-sectional area of the wire is uniform over a major portion of the length of the wire and is reduced over two minor portions of the length of the wire, said minor portions each being located a distance from an end of the wire in a region of a bent part of the wire located in a recess formed between the spool and the locking ring to reduce an initial bending moment of the wire, each end of the wire being disposed in one of the elongate recesses in the spool when the wire is pulled out of the passageways or holes in the spool.

12. The seat belt retractor according to claim 11 wherein the wire has a reduced cross-sectional area portion located at each end of the wire.

13. The seat belt retractor according to claim 11, wherein the locking ring has a groove therein, arranged to receive a central portion of the wire.

14. The seat belt retractor according to claim 12, wherein the locking ring has a groove therein, arranged to receive a central portion of the wire.

15. A seat belt retractor comprising:
    (a) a spool mounted for rotation for retraction or pay-out of a seat belt webbing depending upon the rotation direction of the spool, the spool having two elongate recesses therein;
    (b) a locking ring attached to one end of the spool; means for locking the locking ring against rotation when a crash condition is sensed, the locking ring having a groove in a substantially flat side of the locking ring; and
    (c) a force limiting means for allowing further pay-out of the seat belt webbing after the locking ring has locked, under the influence of a vehicle occupant's forward momentum, coupled in a force path between the spool and the locking ring, the force limiting means comprising
       (i) a primary force limiting means comprising a torsion bar that is coaxial with the spool and that further functions as a spindle; and
       (ii) a secondary force limiting means comprising an elongate deformable wire, arranged such that relative rotation between the spool and the locking ring causes a portion of the length of the wire to be pulled out of passageways or holes in the spool and be deformed during a first stage of load limiting, wherein the cross-sectional area of the wire is uniform over a major portion of the length of the wire and is reduced over two minor portions of the length of the wire, said minor portions each being located a distance from an end of the wire in a region of a bent part of the wire located in a recess formed between the spool and the locking ring to reduce an initial bending moment of the wire, the wire having a reduced cross-sectional area tapered portion located at each end of the wire with each end of the wire being disposed in one of the elongate recesses in the spool and a central portion of the wire being disposed in the groove in the locking ring when the wire is pulled out of the passageways or holes in the spool.

16. The seat belt retractor according to claim 15, wherein the reduced cross-sectional areas at the two minor portions of the length of the wire comprise a curved grooves.

17. The seat belt retractor according to claim 15, wherein the reduced cross-sectional areas at the two minor portions of the length of the wire comprise a V-shaped grooves.

* * * * *